Patented Sept. 11, 1923.

1,467,599

UNITED STATES PATENT OFFICE.

HERBERT C. GORE, OF TAKOMA PARK, MARYLAND, DEDICATED, BY MESNE ASSIGNMENTS, TO THE PEOPLE OF THE UNITED STATES FOR THEIR FREE USE AND ENJOYMENT.

PROCESS FOR PREPARING A SUGAR SIRUP.

No Drawing. Application filed September 12, 1922. Serial No. 587,793.

(FILED UNDER THE ACT OF MARCH 3, 1883, 22 STAT. L., 625.)

*To all whom it may concern:*

Be it known that I, HERBERT C. GORE, a citizen of the United States, and an employee of the Department of Agriculture of the United States of America, residing at Takoma Park, Maryland, and whose post-office address is Department of Agriculture, Washington, D. C., have invented an Improved Process for Preparing a Sugar Sirup.

This application is made under the act of March 3, 1883, chapter 143 (22 Stat., 625), and the invention herein described and claimed may be used by the Government of the United States, its officers and employees, and by any person in the United States without payment to me of any royalty thereon. I hereby dedicate the same to the free use of the Government and the people of the United States.

Cane sirup as now produced from many varieties of sugar cane by the methods usually employed and other sirups rich in sucrose frequently contain so large a proportion of sucrose that more or less sucrose forms in the sirup on standing after cooling in the form of sugar crystals. The presence of such sugar in the sirup injures materially its commercial value.

By inverting a portion of the sugar present in the sirup the cane sugar content can be reduced sufficiently so that separation of sugar crystals does not occur. I find that this can be accomplished by the use of yeast.

In practicing my invention, cane sirup or other sirups rich in sucrose at or near its original density is heated preferably to from 50 to 60 degrees C. and mixed with fresh bakers' yeast in the proportion of approximately 0.02 of 1% of the weight of the cane sirup. It is then kept substantially within the temperature range specified until the desired degree of inversion has occurred. It is then heated to boiling and allowed to cool, thus completing the process. Usually from 15 to 60 hours is required, depending on the amount of yeast used, the density of the sirup, its temperature, and the amount of inversion required. The larger the amount of yeast used, the greater the rate of inversion of the sucrose. The rate of inversion of sucrose decreases with increasing density of sirup, and increases as the temperature rises.

The amount of inversion required varies with the density to which the finished sirup is reduced, and with the temperature at which the finished sirup is to be stored. The greater the density the greater the degree of inversion, and the degree of inversion required is also greater if the sirup is to be kept at winter storage temperatures. For example in case of cane sirup of 39.3 Bé. density the degree of inversion required for storage at 32 degrees F. is approximately that corresponding to 60 purity of the sirup.

Instead of fresh bakers' yeast I find that the equivalent weight of air dried bakers' yeast may be employed.

I claim:

1. The process of preparing cane sirup, consisting in heating cane sirup, in mixing therewith yeast in an amount equivalent to two hundredths of one per cent of the weight of the cane sirup, in continuing the said heat treatment for a period of from 15 to 60 hours, and in finally boiling the mixture, thereby producing a non-crystallizable sirup.

2. The process of preparng sirup rich in sucrose, consisting in heating such sirups, in mixing therewith yeast in an amount equivalent to two hundredths of one per cent of the weight of the sirup, in continuing the said heat treatment for a period of from 15 to 60 hours, and in finally boiling the mixture, thereby producing non-crystallizable sirups.

HERBERT C. GORE.